Sept. 20, 1932. C. O. MARSHALL ET AL 1,878,160
WEIGHING SCALE
Filed July 3, 1926 3 Sheets-Sheet 2
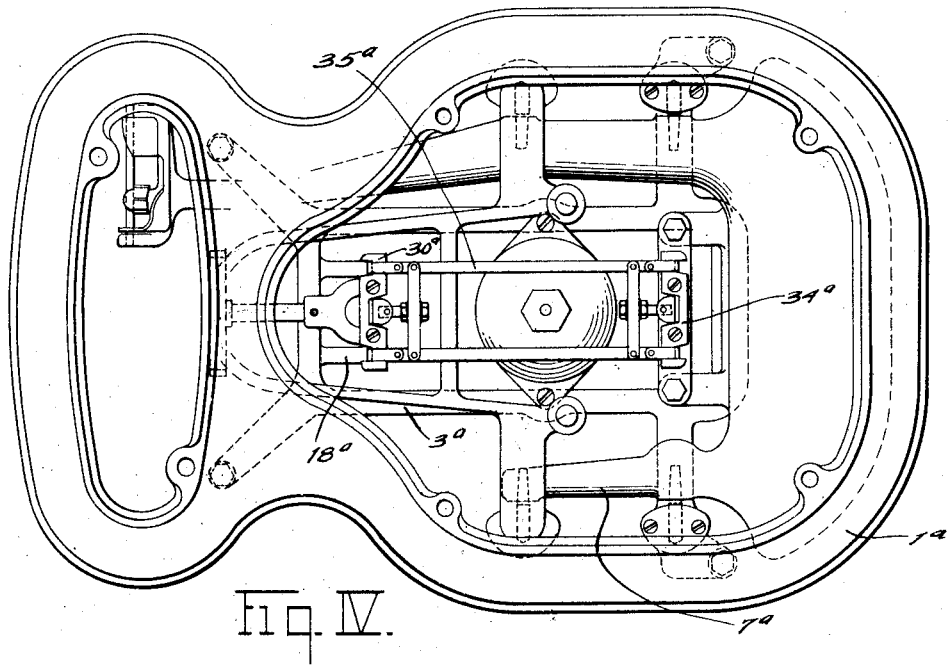
Fig. IV.
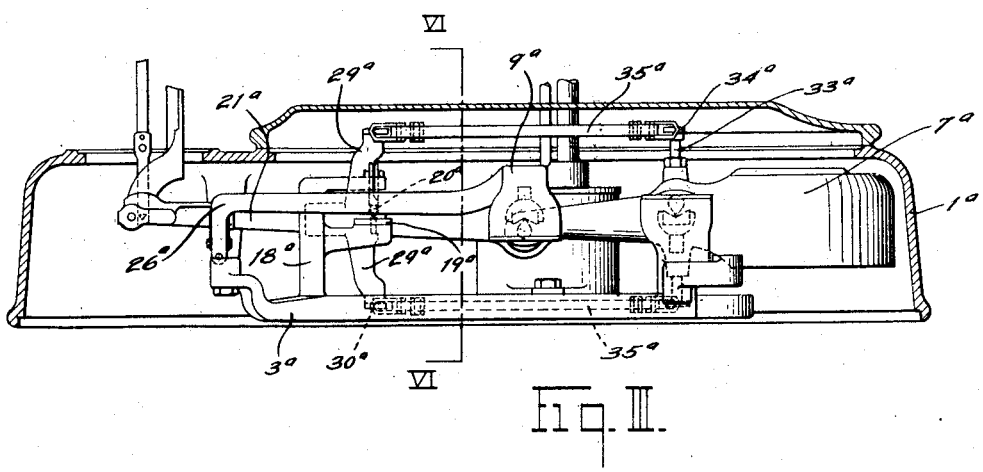
Fig. III.
Inventor
Charles O. Marshall
Halvor O. Hem
By C. O. Marshall
Attorney Sept. 20, 1932.  C. O. MARSHALL ET AL  1,878,160
WEIGHING SCALE
Filed July 3, 1926   3 Sheets-Sheet 3
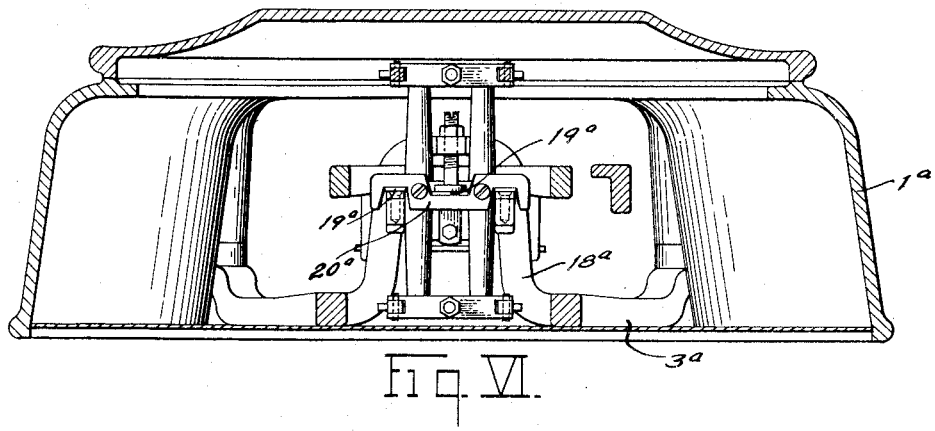
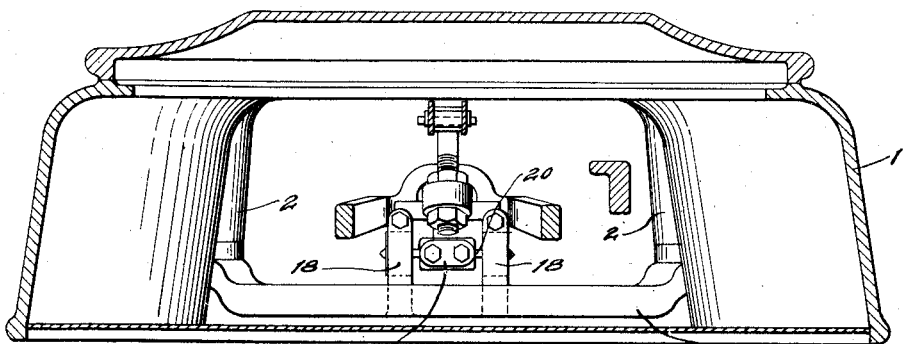
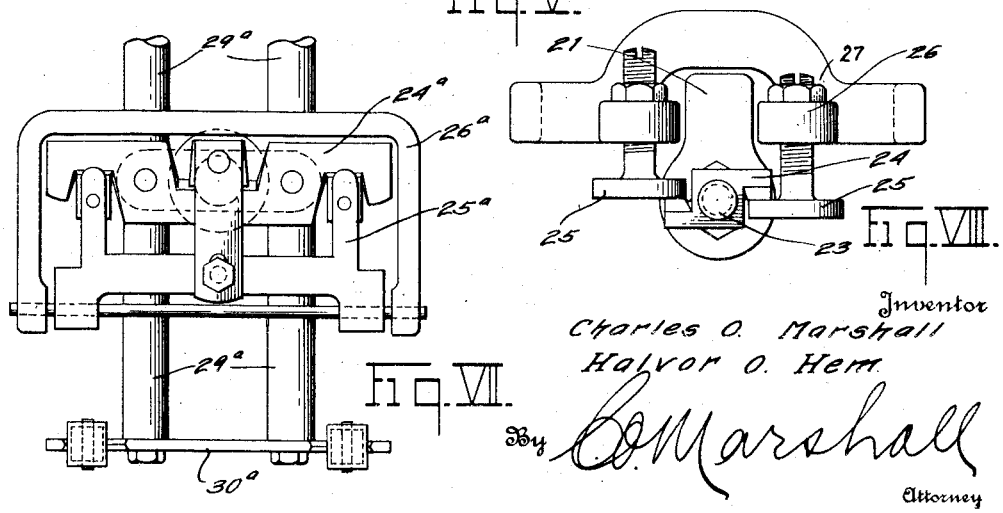
Inventor
Charles O. Marshall
Halvor O. Hem
By C. O. Marshall
Attorney Patented Sept. 20, 1932

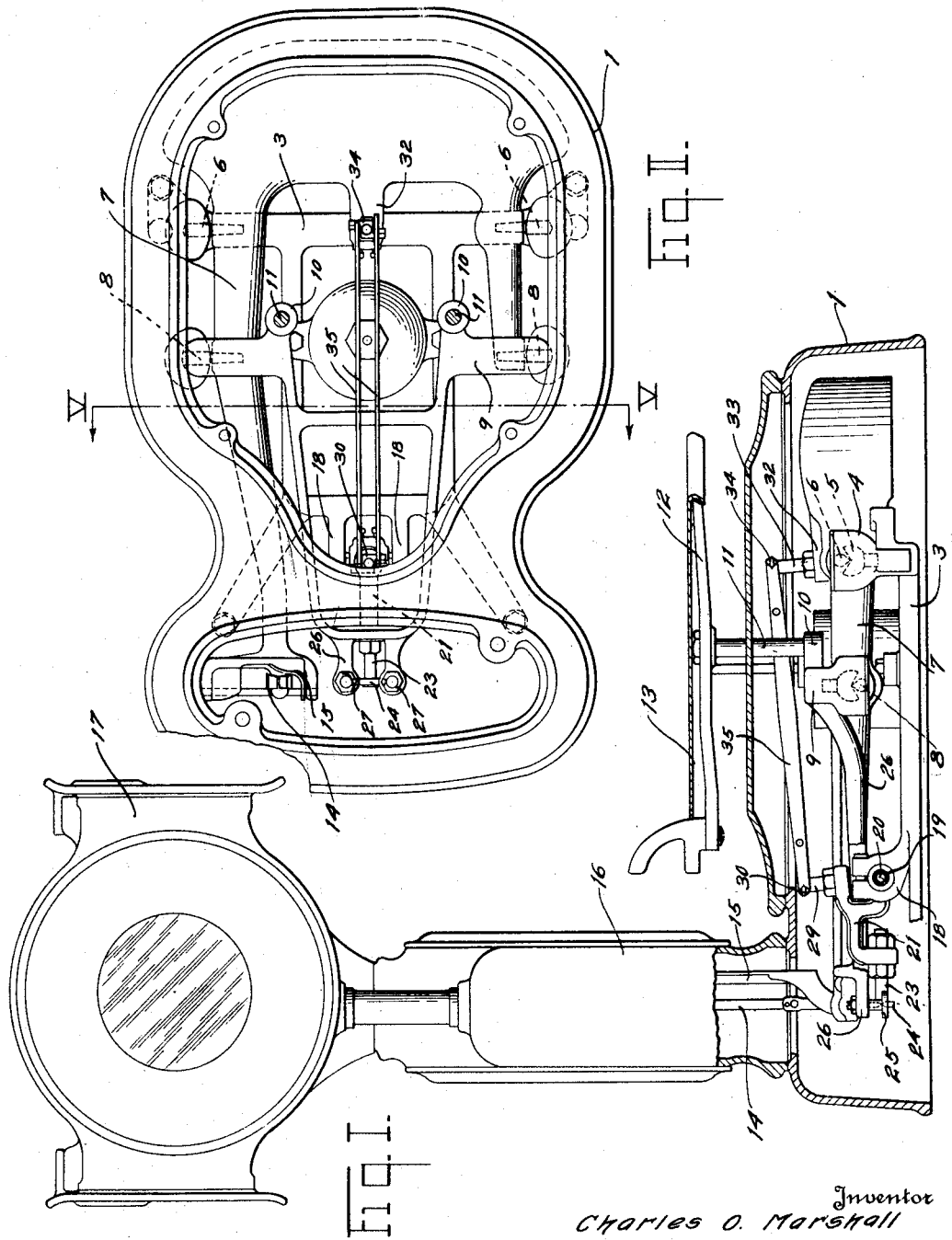

1,878,160

UNITED STATES PATENT OFFICE

CHARLES C. MARSHALL AND HALVOR O. HEM, OF TOLEDO, OHIO, ASSIGNORS TO TOLEDO SCALE MANUFACTURING COMPANY, OF TOLEDO, OHIO, A CORPORATION OF NEW JERSEY

WEIGHING SCALE

Application filed July 3, 1926. Serial No. 120,294.

This invention relates to weighing scales, and more particularly to scales of the type in which the commodity-receiver is supported upon two load pivots with their axes in alignment, supplemental means being employed to maintain the condition of level of the platform throughout the weighing movements of the lever.

One of the principal objects of the invention is to improve the means employed for preventing the commodity-receiver from tipping when the load is placed adjacent one of its edges.

Another object is the provision of simple and positively acting platform stabilizing means adapted for use in scales having the base levers enclosed and platforms in relatively low position.

A further object of the invention is the provision of a platform lever system and stabilizing means which is particularly adapted for use in scales of the counter type in which neat appearance, compactness, sanitary enclosing housing and great sensitiveness are important.

And still another object is the provision of a scale of this type in which the platform lever system is accessible and adapted to be readily and accurately adjusted.

Other objects and advantages will be apparent from the following description, in which reference is had to the accompanying drawings illustrating preferred embodiments of our invention and wherein similar reference numerals designate similar parts throughout the several views.

In the drawings:—

Figure I is a side elevational view of the scale of our invention, parts being broken away and parts shown in section;

Figure II is a top plan view of the base and platform supporting lever mechanism of the scale;

Figure III is a side elevational sectional view through the base of a scale showing a modified form of the platform stabilizing means;

Figure IV is a top plan view of the mechanism illustrated in Figure III;

Figure V is a vertical sectional view through the base mechanism taken substantially on the line V—V of Figure II;

Figure VI is a vertical sectional view through the base mechanism of the modified form of our device taken substantially on the line VI—VI of Figure III;

Figure VII is an enlarged fragmentary detail view of certain elements of our invention;

Figure VIII is an enlarged fragmentary detail view showing other elements of our invention.

Referring to the drawings in detail, the walls of the hollow base 1 which houses and supports the platform lever mechanism are provided with suitable bosses 2 to which is secured a skeleton frame 3. Formed integral with the frame 3 is a pair of fulcrum stands 4 provided with bearings 5 which receive and support the fulcrum pivots 6 of the main lever 7. The lever 7 is also provided with load pivots 8 upon which is supported a spider 9. The latter is provided with bosses 10 having threaded openings which receive the threaded ends of rods 11, the upper ends of the rods being secured to a spider 12 surmounted by the commodity-receiver or platform 13. The nose end of the main lever 7 is connected by means of a flexible metallic ribbon 14 and a bracket 15 to load-counterbalancing and indicating mechanism (not shown), the load-counterbalancing mechanism being located in a hollow column 16 erected upon one end of the base, while the indicating mechanism is located in a substantially cylindrical casing 17 surmounting the column 16.

The frame 3 is provided with integral upwardly projecting bearing supports 18 within which are mounted anti-friction bearings 19 supporting a shaft 20, the latter forming the fulcrum pivot of a bent lever 21. One arm of the lever 21 is bored to receive a stud shaft 23, the outermost end of the shaft having a knife edge pivot plate 24 adapted to engage the surfaces of a pair of disks 25 having tenons adjustably secured to the extremity of a horizontally projecting arm 26 forming an integral part of the spider 9. The disks 25 may be adjusted to engage the knife edges of the member 24 so that no appreciable lost motion between the parts is permitted, the disks being fixedly secured in adjusted position by means of nuts 27. The other arm of the lever 21 is bored to receive a substantially vertical post or shaft 29, and secured to the upper end thereof is a knife edged plate 30. The main lever 7 is provided with a boss or projection 32 having an opening which receives a post 33, the latter being adjustably secured to the lever and having secured to its upper end a knife edged plate 34. The knife edges of the plates 30 and 34 are connected by means of a pair of links 35, one of which is in tension, the other being in compression, the knife edges of the plates 30 and 34 which are engaged by the compression link being turned toward each other, while those engaged by the tension link are turned away from each other, so that the links form a push and pull connection between the upper ends of the posts 29 and 33.

If in the operation of the scale above described a load be placed at the center of the platter 13—that is to say, with the center of mass of the load lying in a vertical plane which passes through the load pivots 8—there will be practically no tendency of the platter to tip in either direction. There will consequently be no substantial upward or downward pressure of the faces of the disks 25 upon the knife edges of the member 24. As the lever load pivots 8 move downwardly and the lever swings about its fulcrum pivots 6, the post 33 which is fixedly secured to the lever will swing to the left and its movement will be transmitted through the links 35 to the post 29. The parts are so arranged that the edge of the fulcrum pivot 6, the knife edges of the plates 30 and 34 and the axis of the shaft 20 lie at the corners of a parallelogram. The angular movement of the bent lever 21 will, therefore, be exactly the same as the angular movement of the main lever 7. The distance between the fulcrum and load pivots 6 and 8 of the main lever is the same as that between the axis of the shaft 20 and the knife edges of the member 24. The parts of the spider 9 which engage the pivot 8 and the knife edges of the member 24, and consequently all parts rigidly connected to the spider 9, will, therefore, move downwardly the same distance during a weighing movement and the platter will remain in the same condition of level.

Since the condition of level of the platter does not change during a weighing movement, a load will have the same effect on the load-counterbalacing mechanism regardless of the part of the platter on which it is placed. If, for example, a load be placed at the left side of the platter it will tend to tilt the platter in a counterclockwise direction about the load pivot 8. The result of this tendency will be to put pressure through the disks 25 upon the knife edges at the end of the bent lever 21, thereby pulling to the left on the links 35 and tending to swing the main lever in the same direction as it would be swung by a load on the load pivots 8. The load on the commodity-receiver will thus be divided, part of it being transmitted to the main lever through the bent lever 21 and the links 35, the remainder being applied to the main lever at the load pivots 8. Since the distance from the axis of the shaft 20 to the knife edges of the member 24 is the same as the distance from the fulcrum to the load pivot of the main lever and the effective lengths of the posts 29 and 33 are the same, the effect on the main lever is the same regardless of whether the load is applied at the load pivot 8 or the knife edges of the member 24 or partly at each.

Since the knife edges of the member 24 are located a considerable distance forwardly of any possible position of the load, the pressure which can be applied to them by placing a load at the left side of the platform will always be much less than the weight of the load and ordinarily the weight of the load will be carried almost entirely by the load pivots 8.

When the load is placed at the right side of the platform 13 it tends to tilt the platter in a clockwise direction so that the disks 25 press upwardly on the knife edges with which they are engaged, the bent lever 21 tends to rock in a clockwise direction, and a push is exerted through one of the links 35 against the post 33 tending to rock the main lever in a direction opposite to that in which it is rocked by a load on the load pivot 8. With the load in this position at the right side of the platter 13, however, the pressure on the load pivot 8 is increased by reason of the fact that the platter spider assembly acts as a lever fulcrumed at 24 and this increase in pressure on the pivot 8 exactly counteracts the effect on the lever of the push applied through the links 35, so that the net effect is the same regardless of where on the platter the load be placed. With the load in the position at the right of the platform, the pressure exerted by the disks 25 on the knife edges of the member 24 is much less than the weight of the load, which is carried principally by the load pivots, the load pivots, of course, being best adapted to support it. In this respect the device of our invention is superior to that of most forms of stabilizing devices, the pivots of which are subjected to greater pressure when the load on the platter is off center.

In the form of device illustrated in Figures III, IV, VI and VII the hollow base 1ª and the parts supporting the main lever 7ª are substantially the same as in the form above described. The same automatic load-counterbalancing and indicating mechanisms are employed in both forms of the device. For this reason only the base and platform lever mechanism of this form have been shown. The frame 3ᵃ in the modified form is provided with upwardly projected bearing supports 18ᵃ upon which are mounted upwardly and downwardly facing bearing plates 19ᵃ which are engaged respectively by downwardly and upwardly projecting aligned knife edges formed upon a single plate 20ᵃ (see Figure VI). The knife edges form the fulcrum of a T lever 21ᵃ, the stem portion of which extends horizontally to the left and carries at its end a knife edge pivot plate 24ᵃ having aligned upwardly and downwardly extending knife edges which engage self-aligning bearings on a flexible frame 25ᵃ which in turn is connected to the end of a horizontally projecting arm 26ᵃ that is rigid with the platform spider 9ᵃ. The cross piece portion of the T lever 21ᵃ consist of a pair each of identical upwardly and downwardly extending members 29ᵃ, each pair having a knife edge plate 30ᵃ secured to its extremities. The main lever 7ᵃ is provided with corresponding pairs of upwardly and downwardly extending posts 33ᵃ, a knife edge plate 34ᵃ being secured to the ends of each pair of posts 33ᵃ. The knife edges of the upper plates 30ᵃ and 34ᵃ are connected by means of a flexible frame 35ᵃ having self-aligning bearings which engage the knife edges of the plates, and the corresponding plates below the lever are connected by a similar device, the frames 35ᵃ forming substantially frictionless push and pull connections above and below the lever 7ᵃ. When a load is so placed upon the platform as to put one of the connections 35ᵃ in tension the other will be placed in compression and the pressure on the pivots and bearings at the ends of the frames 35ᵃ will be divided between the upper and lower sets of pivots. This being the case, it is possible to use with this form of device posts 29ᵃ and 33ᵃ which are shorter than the corresponding posts 29 and 33 of the form first described. Substantially the same effect is obtained if the distance, in the second form, between the upper and lower knife edges on the plates 34ᵃ is as great as the distance, in the first form, from the plate 34 to the axis of the fulcrum pivot 6. With this form of device it is, therefore, possible to utilize the space beneath the lever 7ᵃ as well as the space above it and the enclosing base can, therefore, be somewhat lower than it is practicable to make it with the form first described.

Another advantage possessed by the second form is that there is no horizontal thrust at the fulcrum of the T lever and this lever may, therefore, be fulcrumed with its knife edge fulcrum pivots engaging horizontal flat plates. The length of the connecting frames 35ᵃ with this construction need not be held within close limits, as the T lever may take a position on its fulcrum corresponding to the actual length of the connections. The posts 33ᵃ may be adjusted to bring the pivots at the ends of the connections and the load and fulcrum pivots of the main lever 7ᵃ and the T lever 21ᵃ into proper parallelogrammatic relation.

In both forms of the device the platform stabilizing mechanism is ordinarily substantially idle so far as taking any of the load is concerned. It is only when a load is placed off center that there is any pressure on the pivots and bearings of the platform stabilizing device. These parts are, therefore, subjected to very little wear, and in the construction shown their operation is substantially frictionless even when under load.

The embodiments of our invention herein shown and described are to be regarded as illustrative only, and it is to be understood that the invention is susceptible to variation, modification and change within the spirit and scope of the subjoined claims.

Having described the invention, we claim:

1. In a device of the class described, in combination, a frame, weighing mechanism supported upon said frame and including a lever, having a fulcrum pivot, load pivot and nose pivot in substantial alignment, a platform substantially wholly supported upon said lever, a member pivotally supported upon said frame and connected to said platform, and means connecting said lever and said member to prevent tilting of the platform.

2. In a device of the class described, in combination, a platform lever having fulcrum, nose and load pivots, an additional pivot on said lever lying out of the plane of said fulcrum, nose and load pivots, a platform substantially wholly supported on said load pivot, and means connecting said platform and said additional pivot for maintaining the condition of level of said platform throughout weighing movements of said lever.

3. In a device of the class described, in combination, a platform lever having fulcrum, nose and load pivots, an additional pivot on said lever lying out of the plane of said fulcrum, nose and load pivots, a platform substantially wholly supported on said load pivot, and means connecting said platform and said additional pivot for maintaining the condition of level of said platform throughout weighing movements of said lever, said means including a bent lever having pivots in positions corresponding to the fulcrum, load and additional pivots of the platform lever.

4. In a device of the class described, in combination, a platform lever having fulcrum and load pivots, an additional pivot on said lever lying out of the plane of said fulcrum and load pivots, a platform substantially wholly supported on said load pivot, means connecting said platform and said additional pivot for maintaining the condition of level of said platform throughout weighing movements of said lever, said means including a bent lever having pivots in positions corresponding to the fulcrum, load and additional pivots of the platform lever, and a link connecting the additional pivot of said platform lever and the corresponding pivot on said bent lever.

5. In a device of the class described, in combination, a platform lever having fulcrum and load pivots, an additional pivot on said lever lying out of the plane of said fulcrum and load pivots, a platform substantially wholly supported on said load pivot, means connecting said platform and said additional pivot for maintaining the condition of level of said platform throughout weighing movements of said lever, said means including a bent lever having pivots in positions corresponding to the fulcrum, load and additional pivots of the platform lever, and a link connecting the additional pivot of said platform lever and the corresponding pivot on said bent lever, the pivot of said bent lever corresponding to the load pivot of said platform lever engaging a part rigid with said platform.

6. In a device of the class described, in combination, a platform lever having fulcrum and load pivots, a pair of additional pivots on said lever lying on opposite sides of the plane of said fulcrum and load pivots, a platform supported on said load pivots, and means including another lever having a fixed fulcrum and also including linkage connecting said platform and said pair of additional pivots for maintaining the condition of level of said platform throughout weighing movements of said lever.

7. In a device of the class described, in combination, a platform lever having fulcrum and load pivots, a pair of additional pivots on said lever lying out of the plane of said fulcrum and load pivots, a platform principally supported on said load pivots, and means connecting said platform and said pair of additional pivots for maintaining the condition of level of said platform throughout weighing movements of said lever, said means including a T lever having pivots in positions corresponding to the fulcrum, load and pair of additional pivots of the platform lever.

8. In a device of the class described, in combination, a platform lever having fulcrum and load pivots, a pair of additional pivots on said lever lying out of the plane of said fulcrum and load pivots, a platform principally supported on said load pivots, means connecting said platform and said pair of additional pivots for maintaining the condition of level of said platform throughout weighing movements of said lever, said means including a T lever having pivots in positions corresponding to the fulcrum, load and pair of additional pivots of the platform lever, and links connecting the pair of additional pivots of said platform lever and the corresponding pivot of said T lever.

9. A scale including independent, substantially horizontally arranged levers, a load carrier supported upon said levers, substantially vertically disposed arms upon said levers, and horizontally arranged rods connecting said arms.

10. In a scale, a main lever having, a pair of fulcrum bearings, and a pair of load supporting bearings, a secondary supporting member having a pair of fulcrum bearings and a pair of load supporting bearings, an arm fixed to said lever near the fulcrum point and between the fulcrum bearings and extending above and below said fulcrum, a similar arm fixed to the secondary member near the fulcrum point and between its fulcrum bearings, a rod extending between the upper ends of said arms and another rod extending between the lower ends of said arms, said rods being of equal length and said arms being of equal length whereby to form and maintain a parallelogram throughout the movement of said lever and member.

CHARLES O. MARSHALL.
HALVOR O. HEM.